United States Patent
Ogino et al.

(10) Patent No.: US 8,664,845 B2
(45) Date of Patent: Mar. 4, 2014

(54) DISCHARGE TUBE AND STROBOSCOPIC DEVICE

(75) Inventors: Yasushi Ogino, Kyoto (JP); Hisashi Dejima, Kyoto (JP); Toshiaki Murai, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/575,110

(22) PCT Filed: Mar. 7, 2011

(86) PCT No.: PCT/JP2011/001310
§ 371 (c)(1),
(2), (4) Date: Jul. 25, 2012

(87) PCT Pub. No.: WO2011/111358
PCT Pub. Date: Sep. 15, 2011

(65) Prior Publication Data
US 2012/0293060 A1    Nov. 22, 2012

(30) Foreign Application Priority Data

Mar. 12, 2010  (JP) ................................. 2010-055747
Mar. 12, 2010  (JP) ................................. 2010-055748
Mar. 12, 2010  (JP) ................................. 2010-055749

(51) Int. Cl.
*H01J 61/35*  (2006.01)
(52) U.S. Cl.
USPC ............................. 313/489; 313/110; 313/636
(58) Field of Classification Search
USPC .............. 313/110–113, 489, 636; 362/16–18, 362/255–256
See application file for complete search history.

(56) References Cited

U.S. PATENT DOCUMENTS

| | | | |
|---|---|---|---|
| 3,717,781 A | | 2/1973 | Sadoski et al. |
| 5,536,991 A | * | 7/1996 | Parham et al. ............... 313/113 |
| 6,810,208 B2 | | 10/2004 | Saiki et al. |

FOREIGN PATENT DOCUMENTS

| | | |
|---|---|---|
| EP | 1 933 367 A1 | 6/2008 |
| JP | 56-043570 U | 9/1979 |
| JP | 54-174275 | 12/1979 |
| JP | 57-138772 A | 8/1982 |
| JP | 61-250957 A | 11/1986 |
| JP | 62-206761 A | 9/1987 |
| JP | 64-048365 A | 2/1989 |
| JP | 04-141946 A | 5/1992 |
| JP | 07-072535 A | 3/1995 |
| JP | 2000-149777 A | 5/2000 |
| JP | 2000-227625 A | 8/2000 |
| JP | 2000-251846 A | 9/2000 |
| JP | 2004-071238 A | 3/2004 |
| WO | WO 2010084770 A1 * | 7/2010 |

OTHER PUBLICATIONS

International Search Report for PCT/JP2011/001310 dated Apr. 5, 2011.
Supplementary European Search Report for EP 11 75 3024, Mar. 25, 2013.

* cited by examiner

*Primary Examiner* — Mariceli Santiago
(74) *Attorney, Agent, or Firm* — RatnerPrestia

(57) ABSTRACT

A discharge tube includes a reflective film formed on an outer periphery of a cylindrical glass bulb by metal deposition. The reflective film is deposited in a range of 240° or more in the circumferential direction, and the range being larger in a center part than at each end in the axial direction. A stroboscopic device is equipped with this discharge tube.

6 Claims, 11 Drawing Sheets

| Thickness of reflective film (nm) | 10 | 20 | 30 | 40 | 50 |
|---|---|---|---|---|---|
| Reflectance (%) | 37.24 | 61.09 | 77.48 | 85.90 | 91.81 |
| Thickness of reflective film (nm) | 60 | 70 | 80 | 90 | 100 |
| Reflectance (%) | 94.36 | 95.66 | 96.31 | 96.64 | 96.81 |
| Thickness of reflective film (nm) | 110 | 120 | 130 | 140 | 150 |
| Reflectance (%) | 96.92 | 96.98 | 96.98 | 96.98 | 96.98 |
| Thickness of reflective film (nm) | 160 | 170 | 180 | 190 | 200 |
| Reflectance (%) | 96.98 | 96.98 | 96.98 | 96.98 | 96.98 | ized as the discharge tube provided on a light emitter of a stroboscopic device (e.g., PTL. 1). The reflective film is formed by metal deposition of typically aluminum or silver to reflect the light generated in the discharge tube for improving luminous efficiency.

DISCHARGE TUBE AND STROBOSCOPIC DEVICE

THIS APPLICATION IS A U.S. NATIONAL PHASE APPLICATION OF PCT INTERNATIONAL APPLICATION NO. PCT/JP2011/001310.

TECHNICAL FIELD

The present invention relates to discharge tubes in which a reflective film is formed on an outer periphery of a cylindrical glass bulb by metal deposition, and stroboscopic devices equipped with this discharge tube.

BACKGROUND ART

A discharge tube in which a reflective film is formed on a cylindrical glass bulb such that a belt-like translucent part for transmitting light are secured is conventionally known as the discharge tube provided on a light emitter of a stroboscopic device (e.g., PTL. 1). The reflective film is formed by metal deposition of typically aluminum or silver to reflect the light generated in the discharge tube for improving luminous efficiency.

FIGS. 11A and 11B are overall sectional views of conventional discharge tube 2. Discharge tube 2 irradiates light outward by light emission of entire gas excited inside glass bulb 9. Accordingly, if reflective film 10 is deposited in a small range (area) on the outer periphery of glass bulb, as shown in FIG. 11A, light emission at point G is not reflected on reflective film 10 and irradiated to the back (a direction different from a required direction) of discharge tube 2. Therefore, the quantity of the light is lost. Contrarily, if reflective film 10 is deposited in a large range (area) on the outer periphery of glass bulb 9, as shown in FIG. 11B, a loss of quantity of light can be prevented, but a light distribution range becomes narrow.

Furthermore, in general, reflective film 10 peels off from the outer periphery of glass bulb 9 in discharge tube 2 in which reflective film 10 is formed.

CITATION LIST

Patent Literature

PTL1 Japanese Patent Unexamined Publication No. H7-72535

SUMMARY OF THE INVENTION

A discharge tube of the present invention includes a reflective film formed by depositing metal on an outer periphery of a cylindrical glass bulb. The reflective film is deposited in a range of 240° or more in the circumferential direction, and also the range being larger in a center part than at each end in the axial direction. With this structure, the light generated inside reflects on the reflective film because the reflective film is deposited in the range of 240° or more in the circumferential direction. As a result, the light can be emitted to a required direction (a direction to be irradiated toward a target object). Furthermore, the reflective film is deposited on a larger range (area) at the center part than at each end in the axial direction. Therefore, the light concentrated on the reflective film can be evenly emitted to a broad range.

A stroboscopic device of the present invention is equipped with the above discharge tube.

With this structure, the light generated inside reflects on the reflective film because the reflective film of the discharge tube is deposited in the range of 240° or more in the circumferential direction. As a result, the light can be emitted to a required direction. Furthermore, the reflective film is deposited on a larger range (area) at the center part than at each end in the axial direction of the discharge tube (glass bulb). Therefore, the light concentrated on the reflective film can be evenly emitted to a broad range.

DESCRIPTION OF EMBODIMENTS

A stroboscopic device and a discharge tube in accordance with exemplary embodiments of the present invention are described below with reference to drawings.

(First Exemplary Embodiment)

Figure 1:
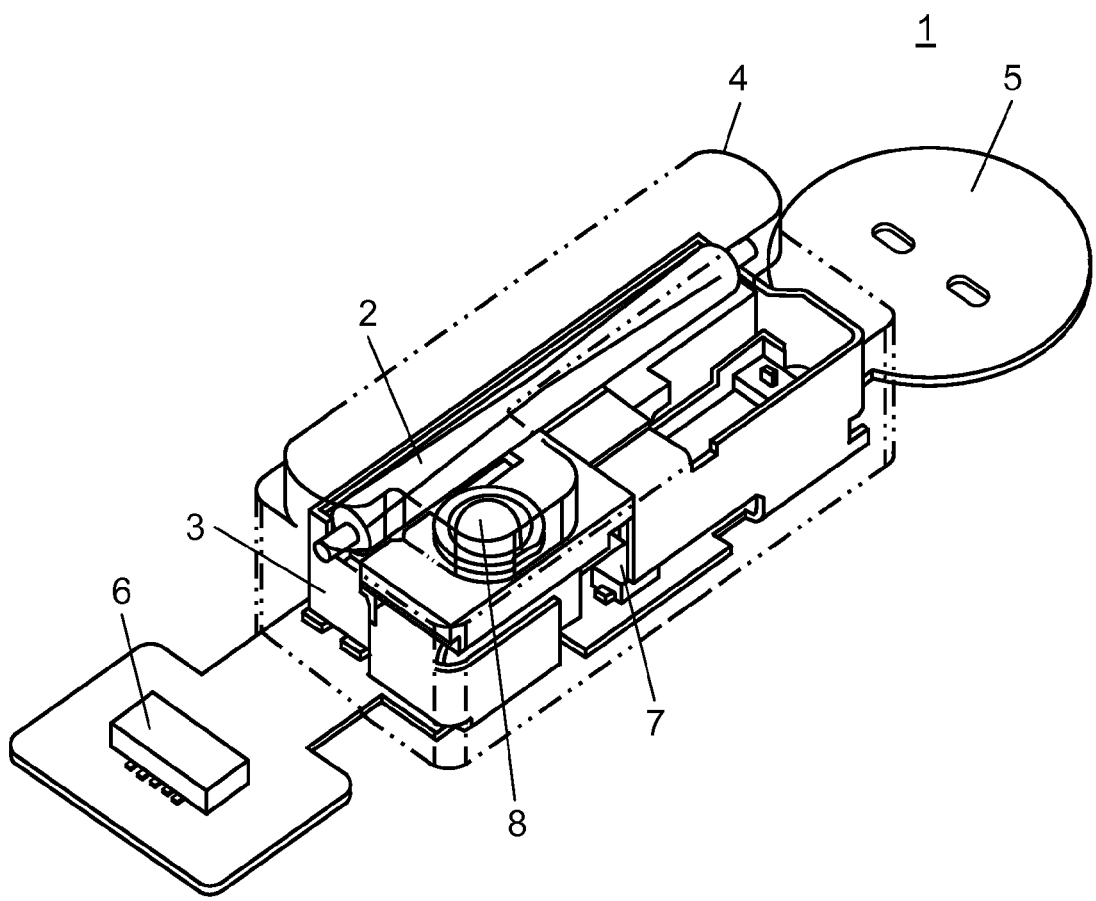
FIG. 1 is an overall perspective view of a stroboscopic device in accordance with a first exemplary embodiment of the present invention.

FIG. 1 is an overall perspective view of stroboscopic device 1 in the first exemplary embodiment of the present invention. Stroboscopic device 1 in this exemplary embodiment is provided in an imaging device (not illustrated). As shown in FIG. 1, stroboscopic device 1 includes discharge tube 2 for emitting light and holder 3 for holding discharge tube 2. Stroboscopic device 1 also includes partially-translucent optical member 4 that houses holder 3 holding discharge tube 2.

Stroboscopic device 1 also includes panel substrate 5 fixed to optical member 4 such that it covers optical member 4. Stroboscopic device 1 also includes a trigger coil (not illustrated) of a high voltage part installed in panel substrate 5, various types of electronic components 6 and 7, and auxiliary light source (LED) 8 that functions as an auxiliary light for auto-focus.

Figure 2A:
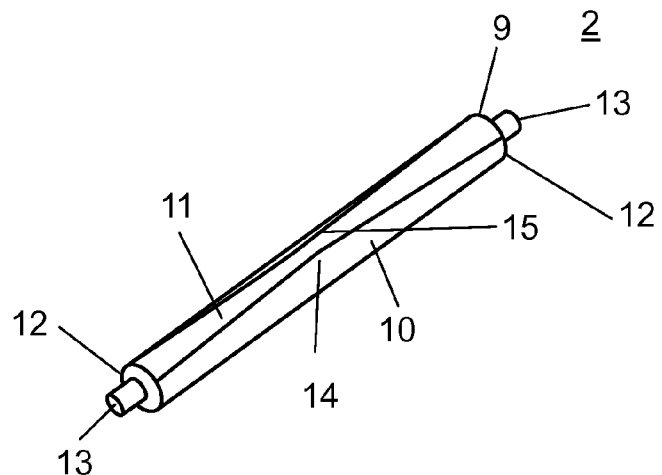
FIG. 2A is an overall perspective view of a discharge tube in accordance with the first exemplary embodiment of the present invention.
Figure 2B:
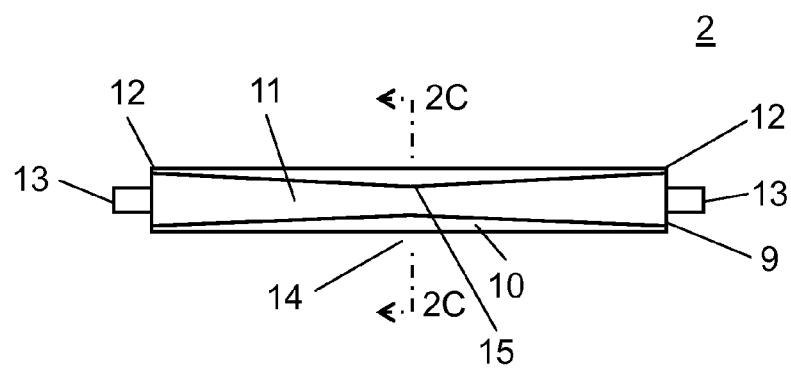
FIG. 2B is an overall plan view of the discharge tube in accordance with the first exemplary embodiment of the present invention.
Figure 2C:
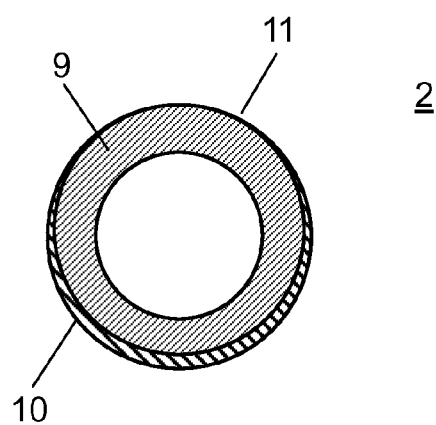
FIG. 2C is a sectional view taken along line 2C-2C in FIG. 2B.

FIG. 2A is an overall perspective view of discharge tube 2 in the exemplary embodiment. FIG. 2B is an overall plan view of discharge tube 2 in the exemplary embodiment. FIG. 2C is a sectional view taken along line 2C-2C in FIG. 2B. Discharge tube (flash discharge tube) 2, as shown in FIGS. 2A to 2C, includes long cylindrical glass bulb 9 and reflective film 10 formed on an outer periphery of glass bulb 9 by metal deposition. Belt-like translucent part 11 that can transmit light is provided at the front side of glass bulb 9 by disposing reflective film 10 on a part of discharge tube 2 in the circumferential direction. Light generated inside discharge tube 2 is emitted outward via this translucent part 11. Discharge tube 2 also includes electrode 13 at each end 12 in the longitudinal direction.

Reflective film 10 is deposited on the outer periphery of glass bulb 9 over the entire length in the axial direction. At the same time, reflective film 10 is deposited on the outer periphery of glass bulb 9 in a range of 240° or more in the circumferential direction. Reflective film 10 is deposited on a larger range (area) at center part 14 than at each end 12 in the axial direction.

More specifically, reflective film 10 is configured such that its deposited range (area) gradually broadens from each end 12 to center 15 in the axial direction. Accordingly, reflective film 10 is disposed such that a pair of edges in the circumferential direction gradually comes closer to each other from one end 12 to center 15 in the axial direction, and gradually come apart from center 15 to the other end 12. In other words, the pair of edges of reflective film 10 in the circumferential direction is not parallel at any part.

Translucent part 11 is thus configured that it gradually becomes smaller from each end 12 to center 15 in the axial direction. In this case, translucent part 11 exists over the entire length of reflective film 10 in the axial direction. For example, reflective film 10 may be deposited at end 12 in a range of 240° or more. At center part 14 (center 15), reflective film 10 may be deposited in a range larger than that at end 12 and smaller than 360°.

Stroboscopic device 1 and discharge tube 2 in this exemplary embodiment are configured as above. Next, a method of manufacturing discharge tube 2 in the exemplary embodiment is described below.

First, a vacuum deposition equipment for depositing metal on glass bulb 9 is described with reference to FIG. 3.

Figure 3:
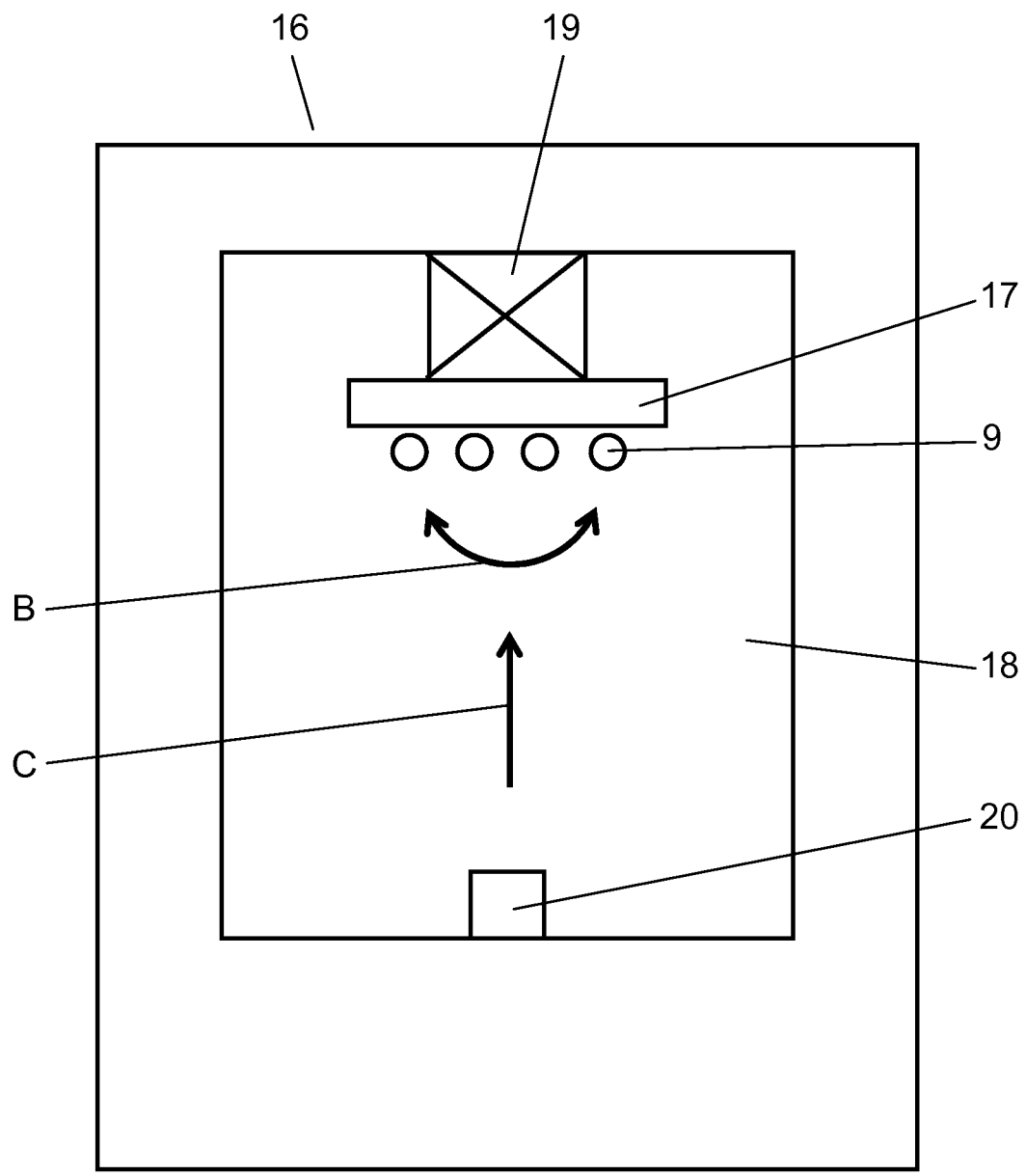
FIG. 3 is an internal front view illustrating a method of manufacturing the discharge tube in accordance with the first exemplary embodiment of the present invention.

As shown in FIG. 3, vacuum deposition equipment 16 includes deposition jig 17 for fixing glass bulb 9, so as to form reflective film 10 by depositing metal on the outer periphery of glass bulb 9.

Deposition jig 17 is installed inside vacuum chamber 18 after fixing glass bulb 9.

Deposition jig 17 can fix multiple glass bulbs 9 from a viewpoint of productivity.

Deposition jig 17 is attached to rotary stage 19 disposed on an upper part of vacuum chamber 18. Deposition source 20, which is metal material that will be reflective film 10 after being deposited on glass bulb 9, is disposed at a lower part of vacuum chamber 18. Aluminum or silver is typically used as deposition source 20.

With this configuration, the position of the outer periphery of glass bulb 9 facing deposition source 20 can be changed by rotating rotary stage 19 about the axial direction (in the direction of arrow B in FIG. 3) of glass bulb 9 fixed to deposition jig 17.

After installing glass bulb 9 and deposition source 20 inside vacuum chamber 18, vacuum chamber 18 is vacuumed. Then, deposition source 20 is heated, the metal material evaporates toward each glass bulb 9 (in the direction of arrow C in FIG. 3), forming reflective film 10 on the outer periphery of each glass bulb 9.

Next, a method of fixing each glass bulb 9 onto deposition jig 17 and a method of installing deposition jig 17 in vacuum chamber 18 are described with reference to FIG. 4.

Figure 4:
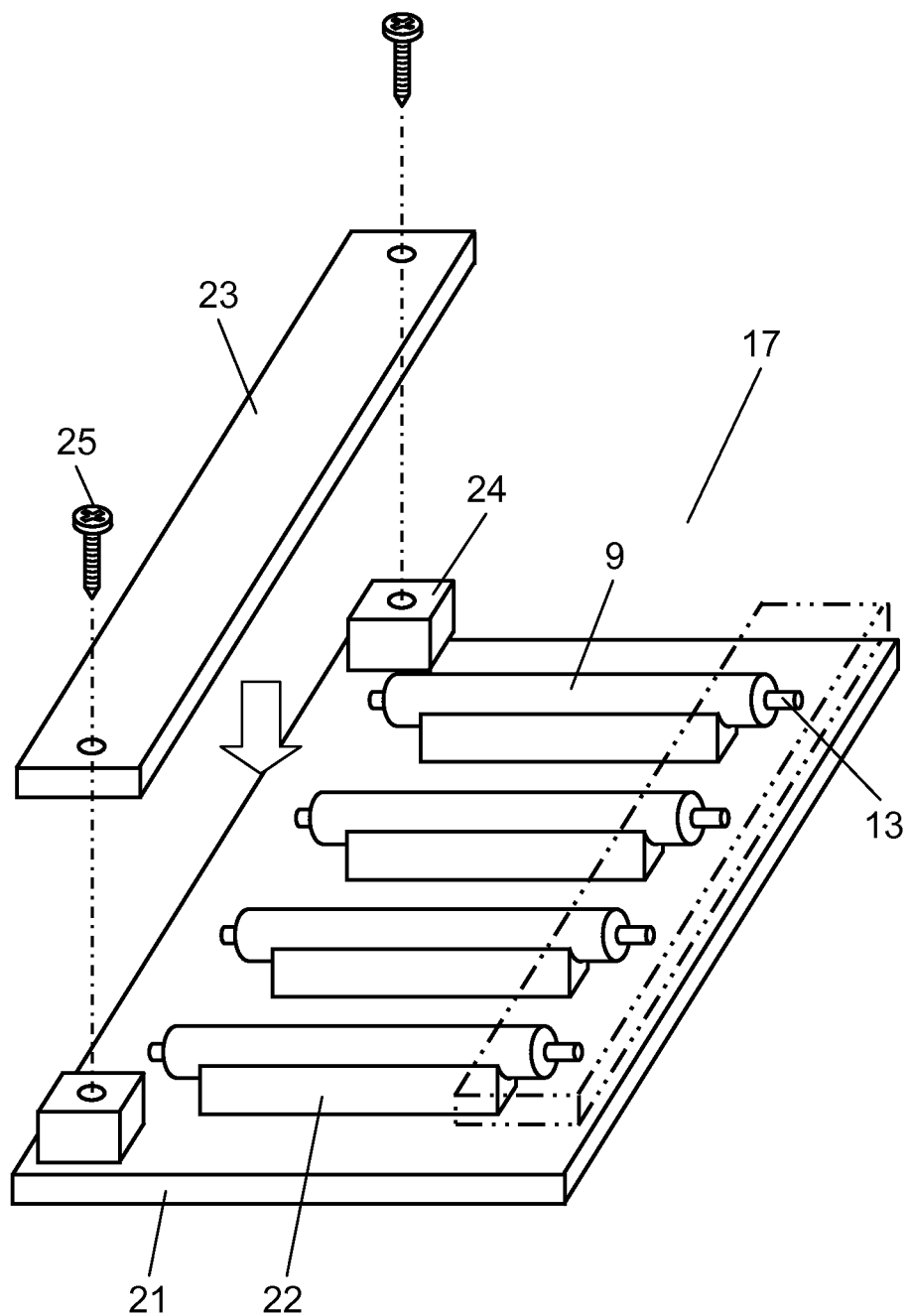
FIG. 4 is a perspective view illustrating the method of manufacturing the discharge tube in accordance with the first exemplary embodiment of the present invention.

As shown in FIG. 4, multiple long mask jigs 22 are provided on base plate 21 in deposition jig 17. After disposing glass bulb 9 in each mask jig 22 such that glass bulbs 9 are aligned in parallel to each other in the longitudinal direction, an end of each glass bulb 9 is held by holder plate 23. Furthermore, holder plate 23 is fixed to attachment block 24 on base plate 21 via screw 25 so as to retain contact with the end of each glass bulb 9.

Then, after fixing each mask jig 22 and each glass bulb 9 on base plate 21, deposition jig 17 is installed in vacuum chamber 18 of vacuum deposition equipment 16 in a state that each glass bulb 9 is positioned below mask jig 22 (the state vertically opposite to the direction in FIG. 4).

Mask jig 22 is for providing a portion that reflective film 10 is not formed on the outer periphery of glass bulb 9, which is the portion of belt-like translucent part 11 where the light passes through. Holder plate 23 fixes mask jig 22 and glass bulb 9, and also prevents film from being formed on electrode 13 disposed at the end of glass bulb 9. Next is described a method of forming reflective film 10 on the outer periphery of glass bulb 9 by depositing metal on glass bulb 9, with reference to FIG. 5.

Figure 5A:
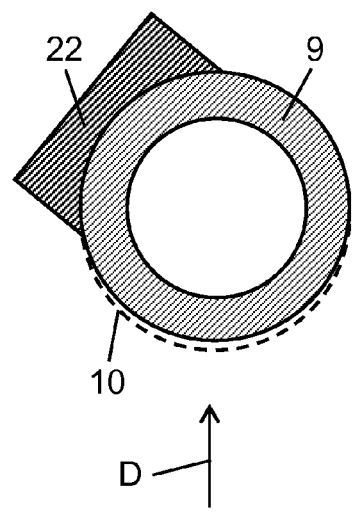
FIG. 5A is a sectional view illustrating the method of manufacturing the discharge tube in accordance with the first exemplary embodiment of the present invention.
Figure 5B:
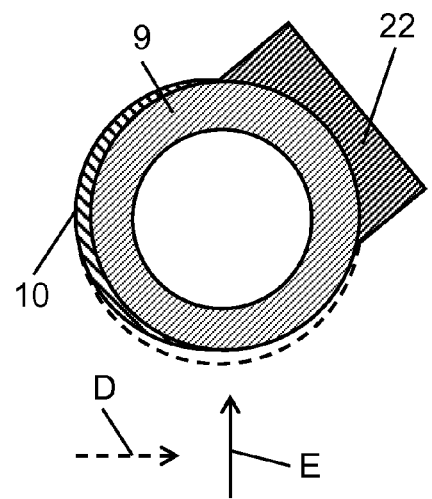
FIG. 5B is a sectional view illustrating the method of manufacturing the discharge tube in accordance with the first exemplary embodiment of the present invention.
Figure 5C:
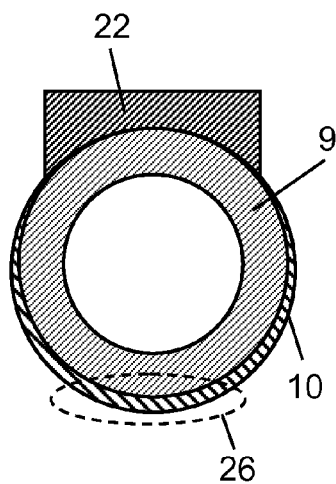
FIG. 5C is a sectional view illustrating the method of manufacturing the discharge tube in accordance with the first exemplary embodiment of the present invention.

FIGS. 5A to 5C are sectional views illustrating the method of manufacturing discharge tube 2 in this exemplary embodiment. First, a rotating angle of rotary stage 19 is set. Deposition is applied to glass bulb 9 in the first direction (direction of arrow D in FIG. 5A) where glass bulb 9 faces deposition source 20. At this point, reflective film 10 is formed in a range of about 180° in the circumferential direction centering on a portion of the outer periphery of glass bulb 9 in front of deposition source 20.

Reflective film 10 is formed such that it gradually becomes thinner from the front part to rear part of the outer periphery of glass bulb 9 relative to deposition source 20. The metal material does not attach to a portion of the outer periphery of glass bulb 9 covered with mask jig 22, and thus reflective film 10 is not formed on this portion.

Next, the front part of the glass bulb 9 relative to deposition source 20 is moved about 90° by rotating rotary stage 19. As shown in FIG. 5B, deposition is now applied to glass bulb 9 in the second direction (direction of arrow E in FIG. 5B) perpendicular to the first direction.

Also at this point, reflective film 10 is formed in a range of about 180° in the circumferential direction centering on a portion of the outer periphery of glass bulb 9 in front of deposition source 20. Reflective film 10 is formed such that it gradually becomes thinner from the front part to rear part of the outer periphery of glass bulb 9 relative to deposition source 20.

By repeating the above procedures at least twice (multiple times depending on a required film thickness), the metal material is deposited on the entire outer periphery of glass bulb 9 except for the portion covered with mask jig 22.

On the outer periphery of glass bulb 9, overlap portion 26 where reflective film 10 is formed by deposition in both directions, i.e., deposition in the first direction and deposition in the second direction, exists. As shown in FIG. 5C, overlap portion 26 of reflective film 10 is the thickest, and the film gradually thins toward translucent part 11.

Figures 6A, 6B:
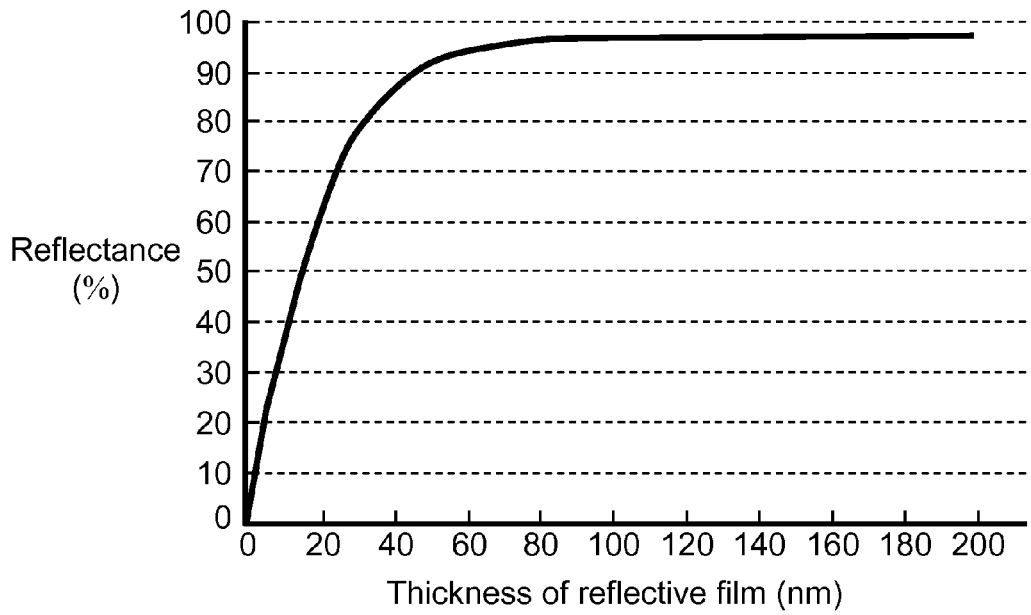
FIG. 6A shows correlation between a reflectance of a reflective film formed on the discharge tube and a thickness of the reflective film in accordance with the first exemplary embodiment of the present invention.
FIG. 6B is a graph illustrating correlation between the reflectance of the reflective film formed on the discharge tube and the thickness of the reflective film in accordance with the first exemplary embodiment of the present invention.

FIG. 6A illustrates correlation of a reflectance of reflective film 10 formed on discharge tube 2 and a thickness of reflective film 10 in the exemplary embodiment. FIG. 6B is a graph illustrating this correlation.

In FIGS. 6A and 6B, the reflectance of reflective film 10 is a mean value obtained by measuring spectral reflectivity in an emission wavelength range of 400 to 700 nm of reflective film 10 formed using silver as deposition source 20. Based on the above results, deposition is applied to form reflective film 10 with a thickness of at least 50 nm or more, preferably 100 nm or more, in the exemplary embodiment. If the thickness of reflective film 10 is 50 nm or more, its reflectance becomes almost the same as that (92%) of a reflective member (reflector) used in the conventional stroboscopic device. Accordingly, the light generated in discharge tube 2 can be sufficiently reflected.

In addition, the thickness of reflective film 10 formed at each end (front part) in the circumferential direction of reflective film 10 where the film likely peels off is 50 nm or more, which is thin to the extent that the reflectance does not degrades. On the other hand, metal particles may scatter at the center part (rear part) in the circumferential direction of reflective film 10 due to impact or heat at the time of light emission from discharge tube 2. Reduction in quantity of reflected light due to reflective film 10 also needs to be prevented. Accordingly, reflective film 10 is preferably formed in the thickness of 100 nm or more.

To set the reflectance higher than that of the conventional reflective member (reflector) in the entire reflective film 10, the film is preferably formed in the thickness of at least 80 nm. The thickness of reflective film 10 at the rear part of discharge tube 2 thus becomes 100 nm or more by using the above deposition method. This will achieve almost the same reflectance (about 96%) in the circumferential direction, averaging the reflectance. As a result, uneven light distribution by the light emitted from the discharge tube can be suppressed.

If an angle of translucent part 11 in the circumferential direction (hereafter also referred to as "opening angle") is a predetermined value or below, i.e., if translucent part 11 is positioned to the front of an inner-diameter rim of discharge tube 2 in the optical axis direction of discharge tube 2, emission of the light generated in discharge tube 2 to the back side can be prevented.

Here, if the opening angle in this position is 2θ, outer radius of the discharge tube is R1, and inner radius of the discharge tube is R2, the following relationship is established.

$$\cos \theta = R2/R1$$

Accordingly, θ needs to be kept at the predetermined value or below in line with a ratio of outer radius R1 and inner radius R2 of the discharge tube. Table 1 shows examples of deposition angles of reflective film 10 based on dimensions (types 1 to 9) of small diameter flash discharge tubes that are generally manufactured.

TABLE 1

| | Outer diameter (mm) | Outer radius R1 (mm) | Inner diameter (mm) | Inner radius R2 (mm) | Opening angle (°) | Deposition angle (°) |
|---|---|---|---|---|---|---|
| Type 1 | 3.50 | 1.75 | 2.30 | 1.15 | 97.8 | 262.2 |
| Type 2 | 3.10 | 1.55 | 1.75 | 0.875 | 111.3 | 248.7 |
| Type 3 | 2.50 | 1.25 | 1.50 | 0.75 | 106.3 | 253.7 |
| Type 4 | 2.00 | 1.00 | 1.50 | 0.75 | 82.8 | 277.2 |
| Type 5 | 2.00 | 1.00 | 1.30 | 0.65 | 98.9 | 261.1 |
| Type 6 | 2.00 | 1.00 | 1.00 | 0.50 | 120.0 | 240.0 |
| Type 7 | 1.80 | 0.90 | 1.00 | 0.50 | 112.5 | 247.5 |
| Type 8 | 1.50 | 0.75 | 1.00 | 0.50 | 96.4 | 263.6 |
| Type 9 | 1.30 | 0.65 | 0.85 | 0.425 | 98.3 | 261.7 |

For example, in case of Type 9, R1=0.65 mm based on Outer diameter=1.30 mm, and R2=0.425 mm based on Inner diameter=0.85 mm. In this case, 2θ=98.3°. Accordingly, the opening angle needs to be set to this value (2θ) or below in order to provide translucent part 11 to the front of the inner diameter rim of discharge tube 2 in the optical axis direction of discharge tube 2. Accordingly, the deposition angle for forming reflective film 10 needs to be 360° (all angles)−98.3° (opening angle)=261.7° or more.

Taking into account the relationship of the outer diameter and inner diameter of a range of practically-used discharge tubes 2 and manufacturing errors (part tolerance) of discharge tube 2, reflective film 10 is preferably formed in a range of 240° or more. In stroboscopic device 1 in the exemplary embodiment, as described above, reflective film 10 is deposited on discharge tube 2 in a range of 240° or more in the circumferential direction. Therefore, the light generated inside discharge tube 2 is reflected on reflective film 10. This enables emission of light in the required direction, and thus loss of quantity of light can be prevented.

Figure 7A:
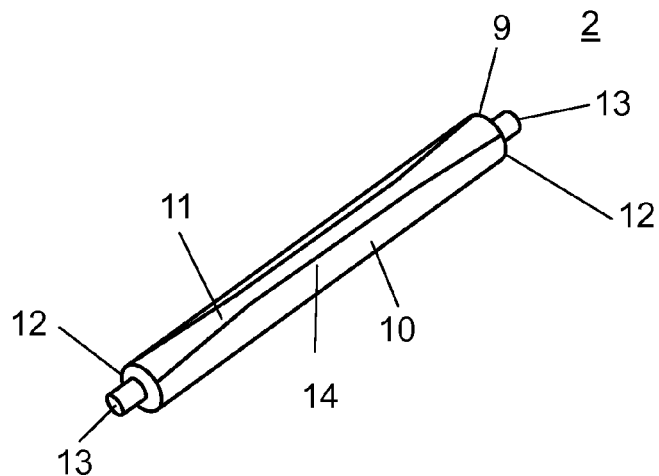
FIG. 7A is an overall perspective view of another example of the discharge tube in accordance with the first exemplary embodiment of the present invention.
Figure 7B:
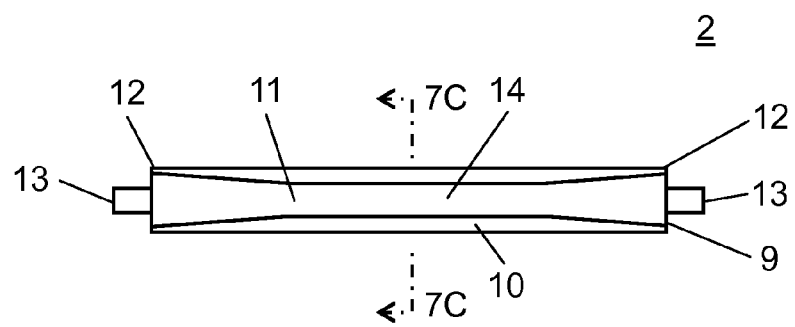
FIG. 7B is an overall plan view of another example of the discharge tube in accordance with the first exemplary embodiment of the present invention.
Figure 7C:
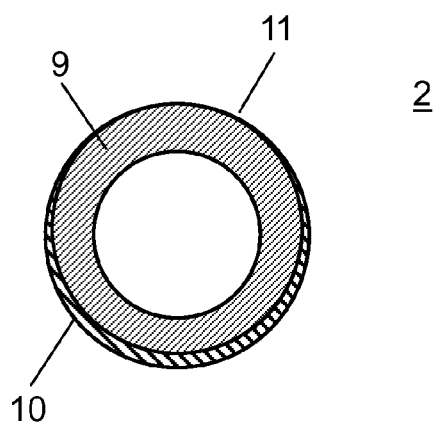
FIG. 7C is a sectional view taken along line 7C-7C in FIG. 7B.

Still more, in stroboscopic device 1 in the exemplary embodiment, reflective film 10 is deposited on a larger range (area) at center part 14 than at each end 12 in the axial direction. The light concentrated on reflective film 10 can thus be evenly emitted to a broad range. Accordingly, uniform light distribution in a broad range can be achieved. FIGS. 7A to 7C show another example of discharge tube in the exemplary embodiment. FIG. 7A is an overall perspective view of discharge tube 2, and FIG. 7B is an overall plan view of discharge tube 2. FIG. 7C is a sectional view taken along line 7C-7C in FIG. 7B.

Here, a guide number (flash output, i.e., quantity of light) and light-distribution angle (angle of a range that retains 50% of quantity of light at the center) are compared among an example of discharge tube 2 in the exemplary embodiment shown in FIGS. 2A to 2C (Example 1), another example of discharge tube 2 in the exemplary embodiment shown in FIGS. 7A to 7C (Example 2), and a comparative example of discharge tube. More specifically, each discharge tube 2 formed from glass bulb 9 described below is connected to a circuit with input voltage of 320V and main capacitor of 75 μF. Table 2 shows results of measured guide numbers and light-distribution angles.

Length of glass bulb (dimension in the axial direction): 22.5 mm

Outer diameter of glass bulb: 1.30 mm

Inner diameter of glass bulb: 0.85 mm

EXAMPLE 1

Discharge tube 2 in Example 1, as shown in FIGS. 2A to 2C, has reflective film 10 in the range (area) (deposition angle) that gradually broadens from each end 12 to center 15 in the axial direction. Discharge tube 2 as configured below is measured.

Deposition range (area) in the axial direction: Entire length of glass bulb in the axial direction (22.5 mm)

Deposition angle at each end 12: 240°

Deposition angle at center part 14 (center 15): 250°, 260°, 270°, 280°

EXAMPLE 2

Discharge tube 2 in Example 2, as shown in FIGS. 7A to 7C, has a portion where the range (area) of reflective film 10 (deposition angle) stays constant along the axial direction at center part 14. Discharge tube 2 as configured below is measured.

Deposition range (area) in the axial direction: Entire length of glass bulb in the axial direction (22.5 mm)

Deposition angle at each end 12: 240°

Length (dimension in the axial direction) of center part 14 (area where the deposition angle is kept uniform): 7.5 mm Deposition angle at center part 14: 250°, 260°, 270°, 280°

COMPARATIVE EXAMPLE

Discharge tube 2 in the comparative example has a given range (area) of reflective film 10 over the entire length in the axial direction. Discharge tube 2 as configured below is measured.

Deposition range (area) in the axial direction: Entire length of glass bulb in the axial direction (22.5 mm)

Deposition angle: 240°, 250°, 260°, 270°, 280°

[Table 2]

| Deposition angle at center part | Example 1 | | Example 2 | | Comparative example | |
|---|---|---|---|---|---|---|
| | Guide number | Light-distribution angle (°) | Guide number | Light-distribution angle (°) | Guide number | Light-distribution angle (°) |
| 240° | | | | | 3.95 | 114.6 |
| 250° | 4.00 | 115.5 | 4.01 | 113.3 | 4.12 | 107.5 |
| 260° | 4.17 | 106.4 | 4.19 | 105.0 | 4.22 | 97.1 |
| 270° | 4.22 | 99.2 | 4.27 | 93.6 | 4.32 | 88.2 |
| 280° | 4.29 | 90.9 | 4.38 | 83.9 | 4.49 | 64.9 |

According to the above results, the guide number can be increased but the light-distribution angle decreases when reflective film 10 is deposited at the same angle (range) over the entire length in the axial direction, although reflective film 10 of discharge tube 2 is formed at 240° or more in the circumferential direction, as in Comparative Example. Contrarily, Example 1 and Example 2 of discharge tube 2 in the exemplary embodiment can increase both guide number and light-distribution angle because reflective film 10 is deposited on the larger range (area) at center part 14 than at each end 12 in the axial direction.

Accordingly, stroboscopic device 1 in the exemplary embodiment can evenly emit the light concentrated on reflective film 10 to a broad range without using the conventional reflective member (reflector). Uniform light distribution in a broad range can thus be achieved.

Stroboscopic device 1 in the exemplary embodiment has reflective film 10 of discharge tube 2 deposited in the range (area) of 240° or more in the circumferential direction. This enables reflection of the light generated inside discharge tube 2 on reflective film 10. Accordingly, the light can be emitted in a required direction, and thus loss of quantity of light can be prevented.

(Second Exemplary Embodiment)

Figure 8:
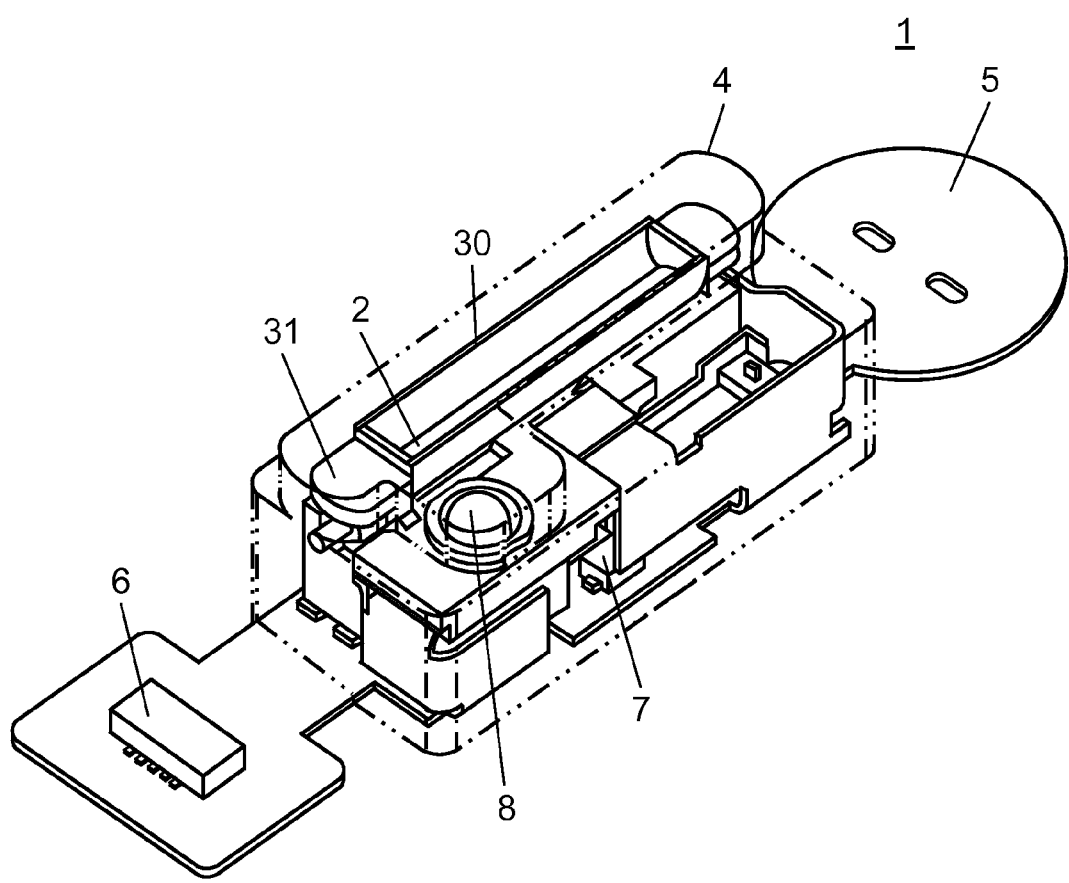
FIG. 8 is an overall perspective view of a stroboscopic device in accordance with a second exemplary embodiment of the present invention.

Stroboscopic device 1 in the second exemplary embodiment of the present invention is described with reference to FIG. 8 and FIGS. 9A and 9B. FIG. 8 is an overall perspective view of stroboscopic device 1 in the exemplary embodiment. As shown in FIG. 8, stroboscopic device 1 includes discharge tube 2 for emitting light, reflective member 30 for reflecting the light emitted from discharge tube 2 toward a target object, and holder 31 for holding discharge tube 2 and reflective member 30. Stroboscopic device 1 also includes partly translucent optical member 4 that houses holder 31 holding discharge tube 2 and reflective member 30.

Stroboscopic device 1 also includes panel substrate 5 fixed to optical member 4 such that it covers optical member 4. Stroboscopic device 1 also includes a trigger coil (not illustrated) of a high voltage part installed in panel substrate 5, various types of electronic components 6 and 7, and auxiliary light source (LED) 8 that functions as an auxiliary light for auto-focus.

Figure 9A:
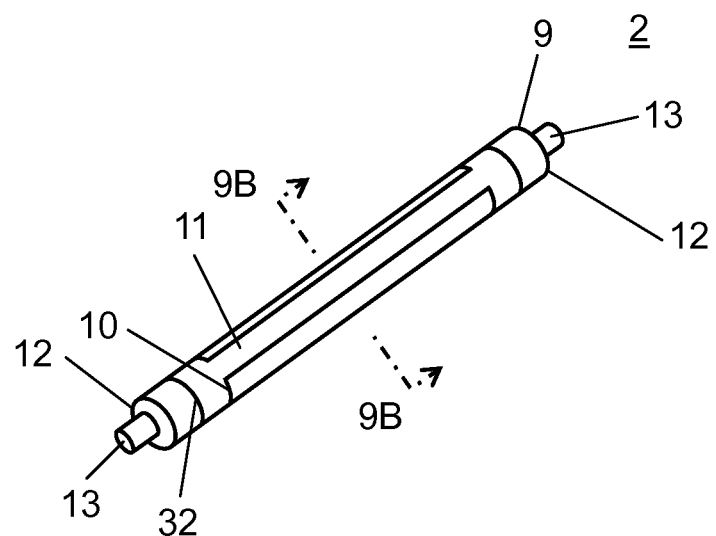
FIG. 9A is an overall perspective view of a discharge tube in accordance with the second exemplary embodiment of the present invention.
Figure 9B:
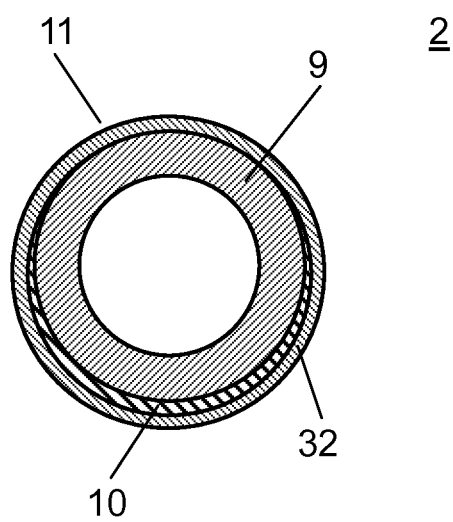
FIG. 9B is a sectional view taken along line 9B-9B in FIG. 9A.

FIG. 9A is an overall perspective view of discharge tube 2 in the exemplary embodiment, and FIG. 9B is a sectional view taken along line 9B-9B in FIG. 9A. Discharge tube (flash discharge tube) 2, as shown in FIGS. 9A and 9B, includes long cylindrical glass bulb 9 and reflective film 10 formed on an outer periphery of glass bulb 9 by metal deposition. Belt-like translucent part 11 that can transmit light is provided at the front side of glass bulb 9 by disposing reflective film 10 on a part of discharge tube 2 in the circumferential direction. Light generated inside discharge tube 2 is emitted outward via this translucent part 11. Discharge tube 2 also includes electrode 13 at each end 12 in the longitudinal direction. Furthermore, discharge tube 2 includes sintered silica film 32 for covering reflective film 10 from outside.

Reflective film 10 is deposited on the outer periphery of glass bulb 9 over the entire length in the axial direction. Reflective film 10 is deposited on the outer periphery of glass bulb 9 in a range of 240° or more in the circumferential direction.

Silica film 32 is disposed at least covering reflective film 10. More specifically, silica film 32 is disposed over the entire length and entire periphery of glass bulb 9. Silica film 32 is formed to achieve a thickness of 20 nm to 200 nm. A vacuum deposition method for depositing metal on the outer periphery of glass bulb 9 in this exemplary embodiment is the same as that in the first exemplary embodiment described using FIGS. 3 to 5C, and thus its description is omitted here.

Next is described a method of forming silica film 32 for covering each glass bulb 9 and reflective film 10.

First, discharge tube 2 in which reflective film 10 is formed on the outer periphery of glass bulb 9 is held to attach silica solution (e.g., silanol ($S_1(OH)_4$: 13 wt %), methanol ($CH_3OH$: 26 wt %), methyl acetate ($CH_3COOCH_3$: 25.8 wt %), ethanol ($C_2H_6OH$: 24 wt %), ethyl acetate ($CH_3COOC_2H_6$: 11 wt %), and phosphorous pentoxide ($P_2O_5$: 0.2 wt %)) to the outside of discharge tube 2 (glass bulb 9 and reflective film 10) (Attachment process). In this process, discharge tube 2 may be dipped in a bath containing the silica solution, or the silica solution may be sprayed onto discharge tube 2. To avoid attachment of the silica solution to electrode 13, a measure, such as covering of electrode 13, needs to be taken.

Next, by spraying nitrogen gas to discharge tube 2, the thickness of silica solution attached to the outside of discharge tube 2 becomes uniform (gas-spraying process). Then, discharge tube 2 is placed in a furnace heated to a high temperature to sinter the silica solution onto discharge tube 2 (sintering process). After natural cooling (cooling process), silica film 32 covering each glass bulb 9 and reflective film 10 is formed.

Since sintered silica film 32 covers reflective film 10 from outside in stroboscopic device 1 in this exemplary embodiment, the outer periphery of glass bulb 9 and reflective film 10 can be firmly bonded. Accordingly, peeling of reflective film 10 from the outer periphery of glass bulb 9 can be prevented.

(Third Exemplary Embodiment)

Figure 10A:
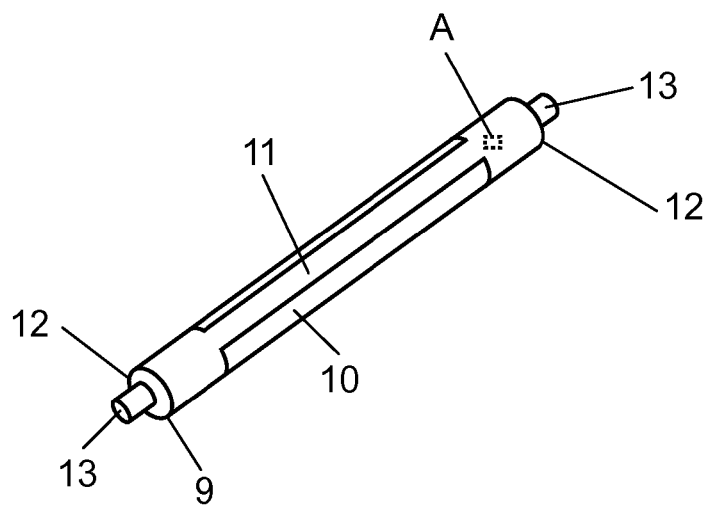
FIG. 10A is an overall perspective view of a discharge tube in accordance with a third exemplary embodiment of the present invention.
Figure 10B:
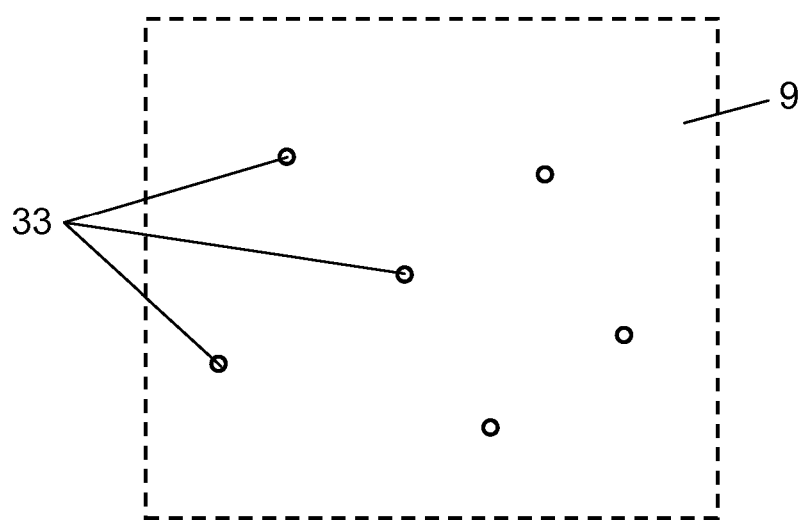
FIG. 10B is a magnified view of area A in FIG. 10A.
Figure 11A:
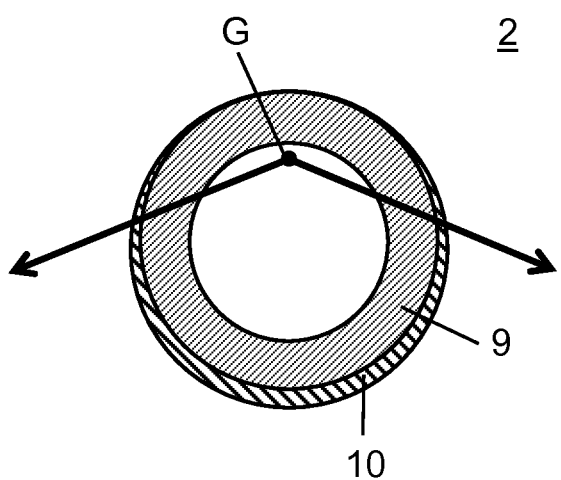
FIG. 11A is an overall sectional view of a conventional discharge tube.
Figure 11B:
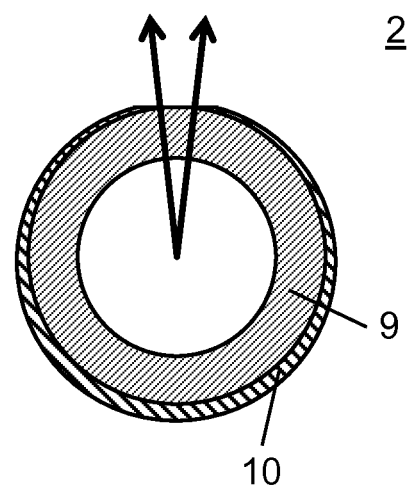
FIG. 11B is an overall sectional view of the conventional discharge tube.

Next, stroboscopic device 1 in the third exemplary embodiment of the present invention is described with reference to FIGS. 10A and 10B. FIG. 10A is an overall perspective view of stroboscopic device 1 in the exemplary embodiment, and FIG. 10B is a magnified view of area A in FIG. 10A. The overall structure of stroboscopic device 1 in this exemplary embodiment is the same as that in FIG. 8 in the second exemplary embodiment, and thus its description is omitted here.

As shown in FIG. 10A, discharge tube (flash discharge tube) 2 includes long cylindrical glass bulb 9 and reflective film 10 formed on the outer periphery of glass bulb 9 by metal deposition. Belt-like translucent part 11 that can transmit light is provided at the front side of glass bulb 9 by disposing reflective film 10 on a part of discharge tube 2 in the circumferential direction. Light generated inside discharge tube 2 is emitted outward via this translucent part 11. Discharge tube 2 also includes electrode 13 at each end 12 in the longitudinal direction.

Glass bulb 9 has multiple concavities 33 in its outer periphery, so as to prevent peeling of reflective film 10. Each concavity 33 is formed with a depth of 1 μm or more. Each concavity 33 is preferably formed to achieve a depth of 1 μm to 10 μm and width of 2 μm to 40 μm. At least one concavity 33 is formed in the outer periphery of glass bulb 9 in 100 μm (micro-meters) square.

Stroboscopic device 1 and discharge tube 2 in this exemplary embodiment are configured as described above. Next is described a method of manufacturing discharge tube 2 in the exemplary embodiment.

First, before depositing metal, the outer periphery of glass bulb 9 is cleaned. Ultrasonic cleaning is first applied to the outer periphery of glass bulb 9 for about five minutes in a pure-water bath containing pure water (pre-washing process). Then, ultrasonic cleaning is applied to the outer periphery of glass bulb 9 in a hydrofluoric-acid bath containing hydrofluoric acid (50% solution) for about sixty minutes (hydrofluoric-acid cleaning process). Then, ultrasonic cleaning is applied to the outer periphery of glass bulb 9 in second and third pure-water bathes containing pure water for about five minutes, respectively, to wash off hydrofluoric acid.

In these processes, hydrofluoric acid attached to the outer periphery of glass bulb 9 is washed off to some extent by cleaning in the second pure-water bath (pre-rinsing process). Then, by cleaning in the third pure-water bath (final rinsing process), hydrofluoric acid attached to the outer periphery of glass bulb 9 is completely washed off. Through these processes, multiple concavities 33 are formed in the outer periphery of glass bulb 9.

The vacuum deposition method for depositing metal on the outer periphery of glass bulb 9 on which concavities 33 are formed is the same as that in the first exemplary embodiment described using FIGS. 3 to 5C, and thus its description is omitted here. As described above, multiple concavities 33 are provided on the outer periphery of glass bulb 9 of discharge tube 2 in stroboscopic device 1 in this exemplary embodiment. This, for example, increases a contact area of glass bulb 9 and reflective film 10, or makes glass bulb 9 and reflective film 10 catch together. Accordingly, glass bulb 9 and reflective film 10 are firmly bonded. As a result, peeling of reflective film 10 from glass bulb 9 can be prevented.

The stroboscopic device and discharge tube of the present invention are not limited to exemplary embodiments described above. It is apparent that all variations which come within the intention of the present invention are embraced therein. It is also apparent that any structure and method in modified examples described below are selected and adopted to the structures and methods in the above exemplary embodiments.

For example, the edge of reflective film 10 in the circumferential direction may be formed stepwise (staircase pattern) so that the range (area) of deposition gradually becomes larger from each end 12 to center part 14 in the axial direction in discharge tube 2 of the present invention.

Still more, a protective layer may be provided after depositing reflective film 10 in discharge tube 2 of the present invention. This protective layer may be formed by placing discharge tube 2 on which reflective film 10 is formed in a furnace heated to a high temperature, and spraying metal, such as tin and indium, on the outer periphery of discharge tube 2.

Metal, such as tin and indium, is used as transparent conductive film (NESA film) in general flash discharge tubes. Therefore, even if this metal film is formed on the outer periphery of discharge tube where reflective film 10 is formed, the light of discharge tube 2 can pass through. In addition, since these types of metal become a transparent crystal layer by spraying it in a heated furnace, it is preferable as the protective layer of reflective film 10.

In particular, if silver is used for reflective film 10, blackening tends to occur due to oxygen or sulfur component in the air. By providing the protective layer, transformation of reflective film 10 is prevented, and also peeling of reflective film 10 from glass bulb 9 can be prevented.

The method of manufacturing discharge tube 2 in the above exemplary embodiments refers to the rotation of rotary stage 19 for changing the angle of the outer periphery of glass bulb 9 relative to deposition source 20. However, the present invention is not limited to this method. For example, each glass bulb 9 may be rotated independently. Or, deposition source 20 may be moved to change the angle relative to the outer periphery of glass bulbs 9.

Still more, the method of manufacturing discharge tube 2 in the above exemplary embodiments refer to deposition using the vacuum deposition method. However, the present invention is not limited to this method. For example, deposition may be applied using sputtering or ion plating.

Still more, in the method of manufacturing discharge tube 2 in the above exemplary embodiments, discharge tube 2 and reflective member 30 may be combined and fixed on deposition jig 17 to deposit reflective film 10, using reflective member 30 as mask jig 22 for deposition. With this manufacturing method, reflective film 10 can be formed more easily at an appropriate deposition angle.

Furthermore, multiple concavities 33 are provided in the outer periphery of glass bulb 9 of discharge tube 2 in stroboscopic device 1 in the above exemplary embodiment. This, for example, broadens the contact area between glass bulb 9 and reflective film 10 or makes glass bulb 9 and reflective film 10 catch together. Glass bulb 9 and reflective film 10 are thus firmly bonded. As a result, peeling of reflective film 10 from glass bulb 9 can be prevented.

Industrial Applicability

As described above, a discharge tube and stroboscopic device of the present invention prevents loss of quantity of light by emitting the light in a required direction. In addition, the light concentrated on the reflective film is evenly emitted to a broad range. Accordingly, the effect of uniform light distribution in a broad range is achieved. The present invention is thus effectively applicable to discharge tubes in which a reflective film is formed on the outer periphery of cylindrical glass bulb by metal deposition, and stroboscopic devices equipped with this discharge tube.

| REFERENCE MARKS IN THE DRAWINGS | |
|---|---|
| 1 | Stroboscopic device |
| 2 | Discharge tube |
| 3, 31 | Holder |
| 4 | Optical member |
| 5 | Panel substrate |
| 6, 7 | Electronic component |
| 8 | Auxiliary light source |
| 9 | Glass bulb |
| 10 | Reflective film |
| 11 | Translucent part |
| 12 | End |
| 13 | Electrode |
| 14 | Center part |
| 15 | Center |
| 16 | Vacuum deposition equipment |
| 17 | Deposition jig |
| 18 | Vacuum chamber |
| 19 | Rotary stage |
| 20 | Deposition source |
| 21 | Base plate |
| 22 | Mask jig |
| 23 | Holder plate |
| 24 | Attachment block |
| 25 | Screw |
| 26 | Overlap portion |
| 30 | Reflective member |
| 32 | Silica film |
| 33 | Concavity |

The invention claimed is:

1. A flash discharge tube for a stroboscopic device comprising a reflective film formed by depositing metal on an outer periphery of a cylindrical glass bulb, the reflective film being deposited in a range of not less than 240° in a circumferential direction, and the range along a translucent part of the bulb increasing from each end towards a center part in an axial direction, wherein the glass bulb has a plurality of concavities in the outer periphery, and wherein the reflective film increases in thickness along a circumferential direction away from said translucent part.

2. The flash discharge tube for a stroboscopic device of claim 1, wherein the range of the deposited reflective film is kept uniform in an area the center part along the axial direction.

3. The flash discharge tube for a stroboscopic device of claim 1, wherein the reflective film is covered with a sintered silica film from outside.

4. The flash discharge tube for a stroboscopic device of claim 3, wherein the silica film is formed in a thickness of 20 nm to 200 nm.

5. The flash discharge tube for a stroboscopic device of claim 1, wherein the plurality of concavities are formed in a depth of 1 μm to 10 μm.

6. A stroboscopic device equipped with the flash discharge tube for a stroboscopic device of claim 1.

* * * * *